H. W. & R. H. SOUDER.
THERMOSTATIC HEAT REGULATOR.
APPLICATION FILED MAY 4, 1916.
1,204,909.
Patented Nov. 14, 1916.
3 SHEETS—SHEET 2.
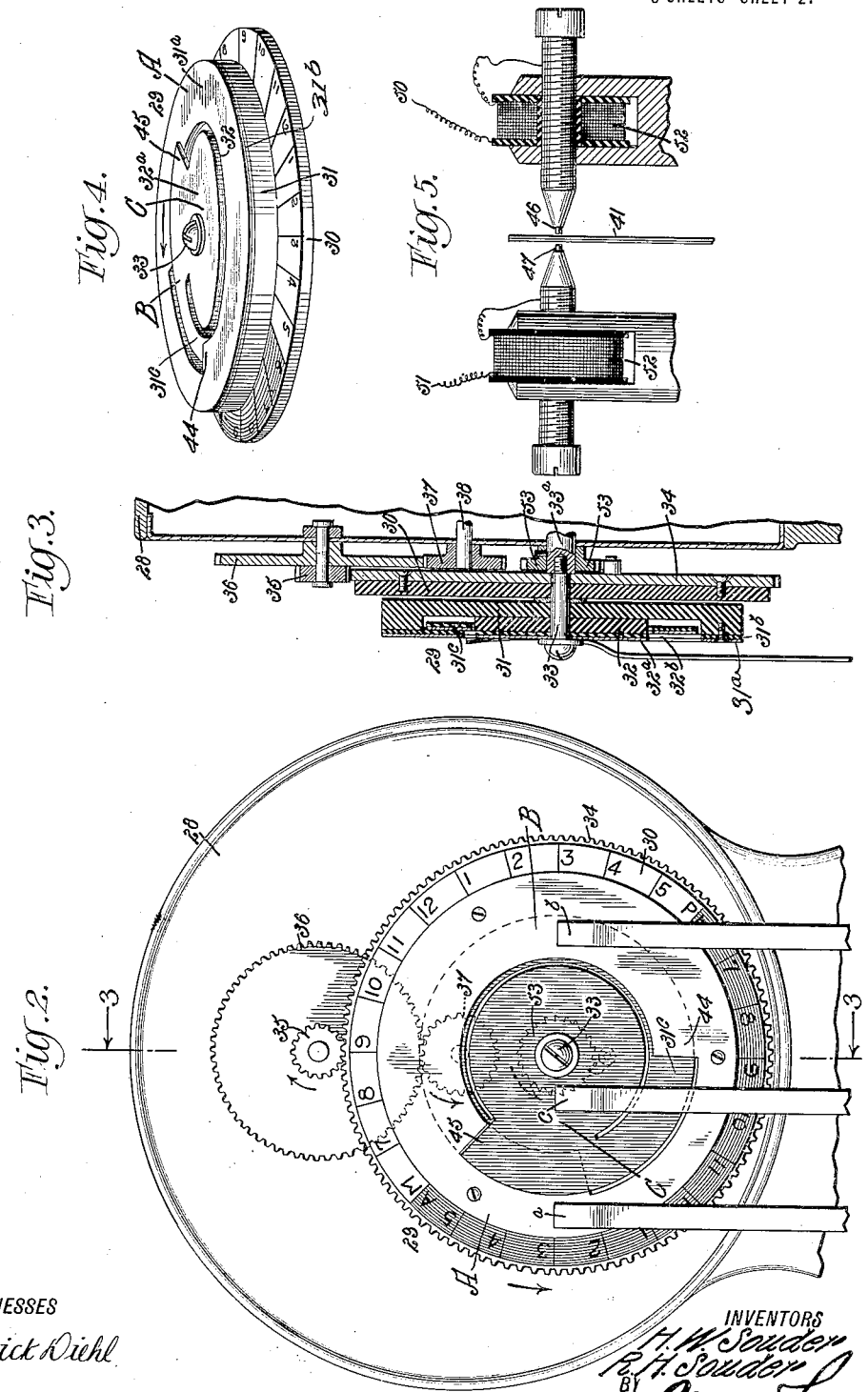
WITNESSES
Frederick Diehl
Geo. W. Beeler
INVENTORS
H. W. Souder
R. H. Souder
BY
ATTORNEYS

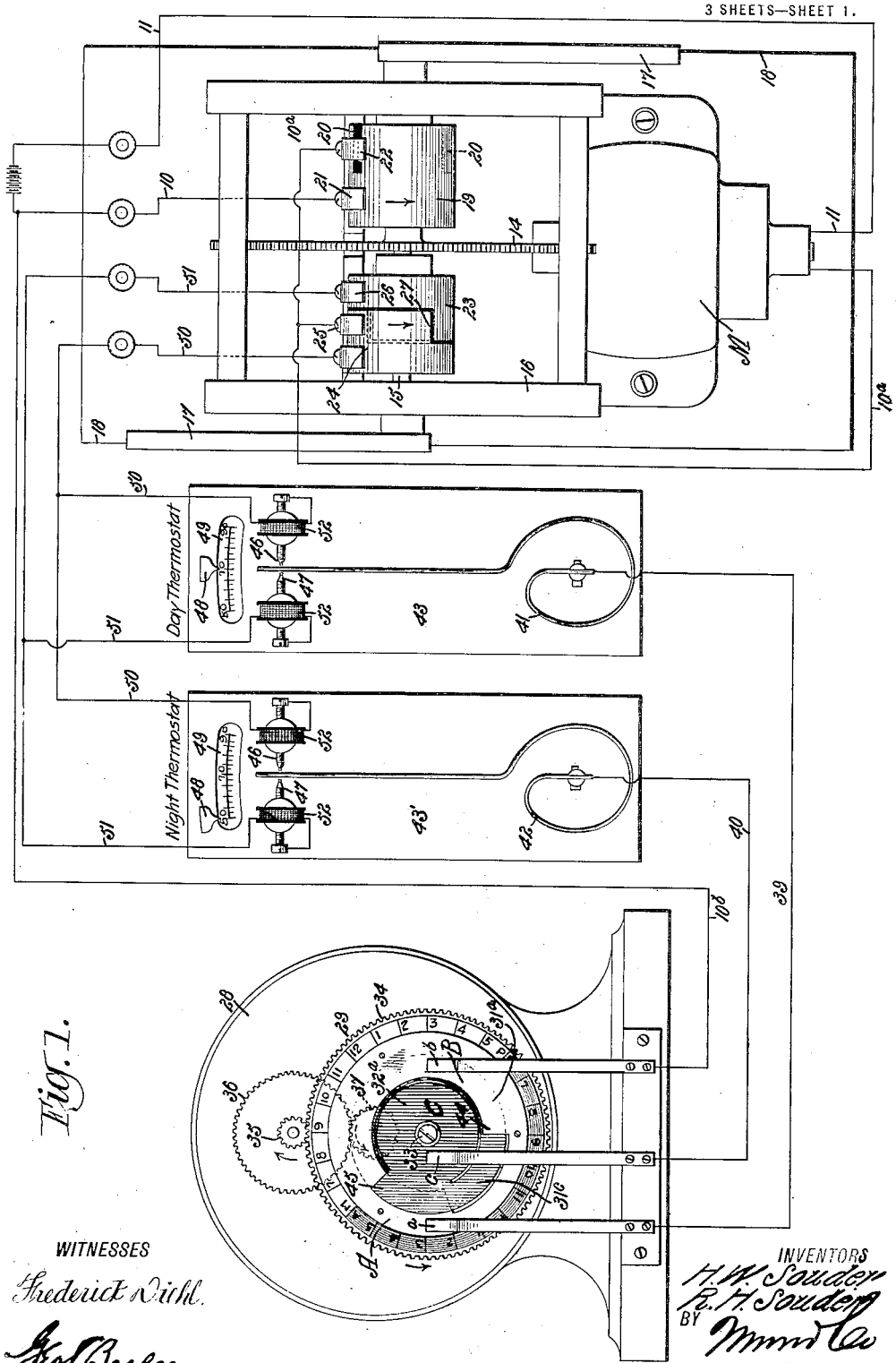

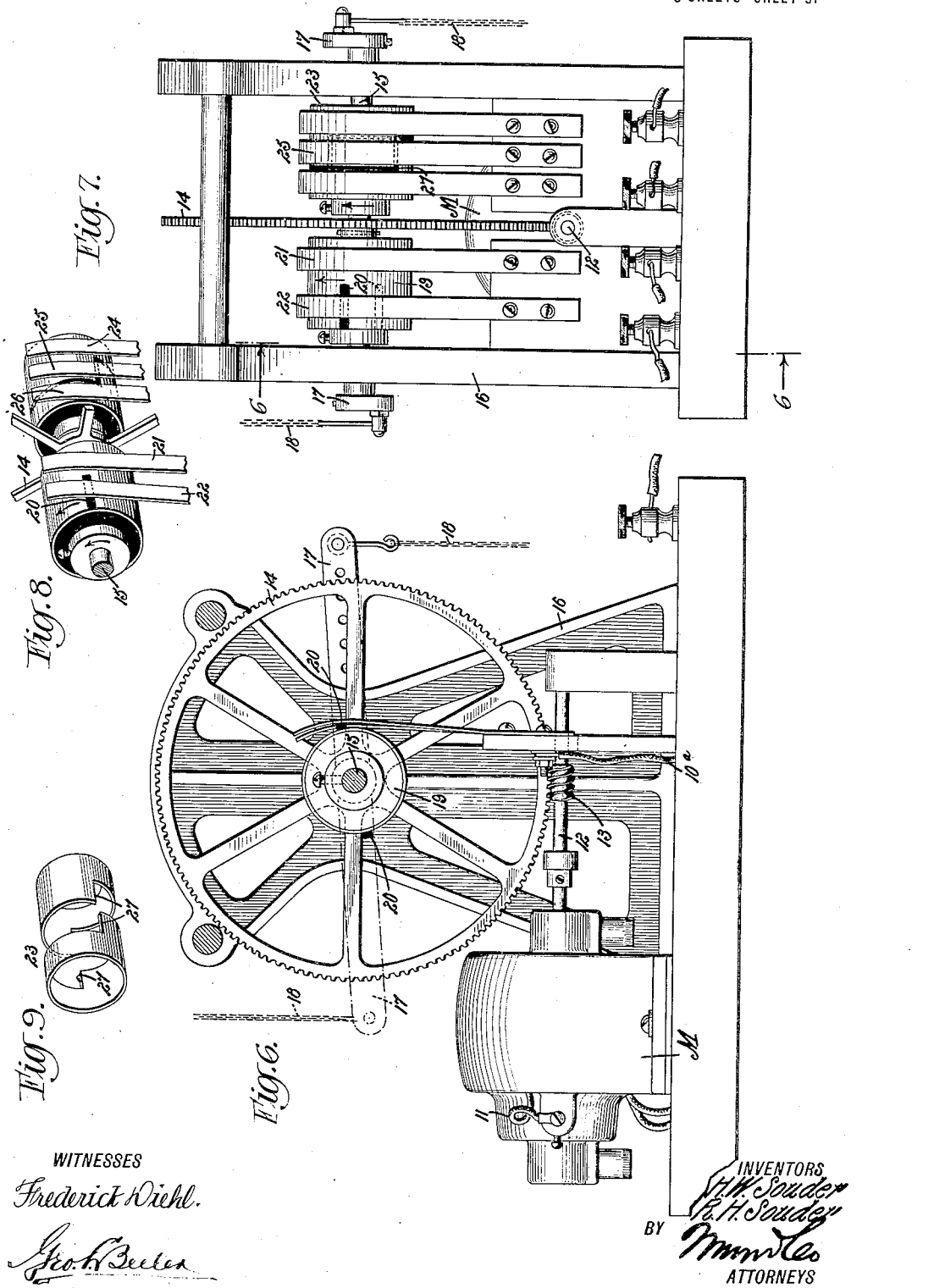

UNITED STATES PATENT OFFICE.

HOWELL W. SOUDER AND ROBERT H. SOUDER, OF TAMAQUA, PENNSYLVANIA.

THERMOSTATIC HEAT-REGULATOR.

1,204,909.　　　　　Specification of Letters Patent.　　Patented Nov. 14, 1916.

Application filed May 4, 1916.　Serial No. 95,502.

*To all whom it may concern:*

Be it known that we, HOWELL W. SOUDER and ROBERT H. SOUDER, both citizens of the United States, and residents of Tamaqua, in the county of Schuylkill and State of Pennsylvania, have invented a new and Improved Thermostatic Heat-Regulator, of which the following is a full, clear, and exact description.

This invention relates to thermostatic heat regulators or heat controllers and has particular reference to such devices as are adapted to be installed in residences, office buildings or other structures that are heated by any suitable system of artificial heat controllable by dampers, switches or other mechanical means adapted to be operated from time to time to increase or decrease the force of the source of heat.

Among the objects of this invention is to provide a heat regulating system of the general nature set forth above, in which we employ a plurality of thermostats adapted respectively to provide for different standard temperatures at different hours of the day or night, and time controlled mechanism to bring the several thermostats selectively into operative relation to the system automatically.

More specifically stated, one of our principal objects is to provide a heat regulating system for a dwelling house or the like, the system including what we term a day thermostat adapted to maintain a certain temperature, variable if desired, beginning at any suitable hour before the occupants of the building are astir and continuing until about or near the time to retire, and a night thermostat which is idle during the time of operation of the day thermostat and brought into operation in this system to the exclusion of the day thermostat at a predetermined time controlled by any suitable clock mechanism located at any convenient place.

A further object of the invention is to provide, in combination with the plurality of selectively operated thermostats, a disk-like commutator having a plurality of contact points, one of which is constant and the other two of which are selectively brought into operation with the selective thermostats, the change from one thermostat to the other being effected by the rotation of the disk according to the operation of the hands of the clock.

Another object of this invention is to provide an electric motor adapted to be operated by either direct or alternating current from any convenient source of power such, for instance, as the ordinary lighting system of a house, there being associated with the motor a commutator connected to the several thermostats and designed to initiate the operation of the motor, and also a circuit breaker serving to stop the motor at some predetermined time after the commutator has cut off the current through the thermostat.

A still further object of the invention is the provision of a thermostat including a novel form of contact mechanism adapted to prevent injury to the contacts due to arcing irrespective of the character of the current being used.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a diagram indicating the system above referred to and showing the relation of the clock mechanism to the compound thermostats, and motor controlling means; Fig. 2 is a rear elevation of the clock mechanism showing the disk commutator in relation to the constant and selective contact plates; Fig. 3 is a vertical sectional view of the same on the line 3—3 of Fig. 2; Fig. 4 is a perspective view of the disk commutator; Fig. 5 is a detail view of the free end of one thermostat blade and the arc eliminating contacts coöperating therewith; Fig. 6 is a vertical sectional view on the line 6—6 of Fig. 7; Fig. 7 is a rear elevation of the motor and associated parts; Fig. 8 is a perspective view from the rear of the adjustable commutator and circuit breaker associated with the motor; and Fig. 9 is a perspective view of the metal parts of the cylindrical commutator, said parts being separated to better disclose their form.

Referring now to the general system represented by the diagram of Fig. 1, we show an electric motor M to which current is adapted to be supplied from any suitable source of electricity through feed wires 10 and 11. The motor shaft 12 carries a worm 13 meshing with a worm gear 14 mounted upon a shaft 15 journaled in fixed bearings upon the stationary frame 16 of the motor mechanism. The worm gear 14 is of large size in comparison with the pitch of the worm, and hence a very small motor consuming a minimum amount of energy will suffice to operate the mechanical heat controlling devices of any ordinary plant, the time of operation of the motor being in any case comparatively brief.

To the ends or other suitable portions of the shaft 15 are connected heat controlling elements, shown herein as levers 17 which are adapted to be adjusted circumferentially of the shaft 15 in any suitable direction so as to accommodate the mechanism to dampers, draft controllers, switches, or other heat controlling devices irrespective of the location or particular type thereof, but the same being indicated generically as including chains 18 or their equivalent leading from the levers. By the term "levers" as used hereinafter, therefore, we wish to cover any suitable mechanical connection between the motor mechanism and the mechanical parts to be shifted or changed thereby to increase or decrease the amount of heat.

The mechanism contemplated herein includes a motor adapted for rotation in one direction only, and far enough at each rotation to cause the worm gear 14 and shaft 15 to be given a half rotation. A circuit breaker 19, shown as cylindrical in form, is adjusted upon the shaft 15 and is provided with a pair of dead points 20 at diametrically opposite sides of one end thereof. The adjustment of the circuit breaker around the shaft is determined by the position of the levers, so that the motor will be stopped by virtue of one or the other of the dead points at the proper time with respect to the mechanical connections with the levers. The body of the circuit breaker 19 provides a connection along with contact springs 21 and 22 between the main feed wire 10 and the branch 10ª thereof adjacent the motor, as soon as the shaft 15 is turned far enough to bring the dead point 20 from beneath the spring 22, or that dead point at which the motor has been stopped.

Secured to the other end of the shaft 15, in the same manner as above described for the circuit breaker, is a cylindrical commutator 23 comprising three circumferential parallel fields coöperating with a like number of contact springs 24, 25, and 26. The two end fields of the commutator have constant contact with the springs 24 and 26 respectively and the intermediate field comprises one portion extending from one end of the commutator and another portion extending from the other end of the commutator. In other words, the intermediate contact spring 25 coöperates in alternation with the two end fields of the commutator, being in communication with one end field during one half rotation and with the other field during the next half rotation. Each of the end fields with its extension consists of a hollow cylindrical shell electrically insulated from the other at all points and from other parts of the machine. The direction of rotation of the commutator and circuit breaker is indicated by the arrows on Fig. 1, and the gaps 27 between the aforesaid extensions at the intermediate field or zone of the commutator are arranged diametrically opposite each other. The contact 25, having constant connection with the motor through the line 10ª, is preferably so related to the intermediate zone as to lie just ahead of one of said gaps, so that when the motor is started the next time, the gap adjacent the constant contact spring 25 will pass beneath and beyond the same soon after the motor starts. In other words, the contact between the spring 25 and the extension is sufficiently remote from the adjacent gap 27 to permit the dead point, last effective to stop the motor, to pass out of contact with the spring 22.

We now describe the clock mechanism with reference to the selective connections with a plurality of thermostats.

28 indicates a timepiece of any suitable construction and located at any desired place. Arranged preferably at the back of the clock, so as to be out of the way of the face of the clock and the usual controlling means therefor, is a commutator indicated as a whole at 29, but shown in detail in Fig. 3 as comprising a series of disks 30, 31, and 32, arranged concentrically around or on a shaft 33 connected to or consisting of a part of a power shaft 33ª of the clock. Each of the disks 31 and 32 is adjustable independently of the other disks around the axis of the shaft 33. These disks furthermore are all of insulation material or insulated apart by any suitable means. The first mentioned disk 30 is connected to a gear wheel 34 meshing with a pinion 35 rigidly connected to a gear 36 driven from a pinion 37 mounted upon a shaft 38 rotating with the minute hand (not shown) of the clock, and hence said disk makes one rotation every twenty-four hours in the same direction as the hands of the clock, and accordingly the periphery of the disk 30 is provided with two sets of numerals, each from one to twelve and corresponding respectively to time a. m. and time p. m. The field on which these numerals are arranged may be otherwise divided so as to indicate day light and darkness approximately, as from 6 a. m. to 6 p. m. The gear wheel 34 being positively geared to the minute hand of the clock always bears the same relation thereto.

Upon the face of the disk shaped commutator 29 are formed two concentric relatively rotatable contact plates $31^a$ and $32^a$. The plate $31^a$ is secured to the disk 31, and is lined with insulation $31^b$ to prevent contact with any part beneath it. The inner plate $32^a$ lies over the disk 32 and is lined with a sheet of insulation $32^b$ to prevent electrical connection with any part beneath it. The two commutator plates $31^a$ and $32^a$ provide a series of three concentric contact fields indicated at A, B, and C, with which coöperate respectively and constantly contact springs $a$, $b$, and $c$.

Referring now again to the diagram of Fig. 1, it will be noted that the contact spring $b$ has constant connection through the branch wire $10^b$ with the feed wire 10. Also the contact springs $a$ and $c$ are connected respectively through the wires 39 and 40 with the composite blades 41 and 42 constituting the main elements of a pair of independent thermostats 43 and 43', which may be located either adjacent each other or at any desired remote places and constituting day and night elements respectively. The constant contact spring $b$ is always in circuit through one or the other of the alternative springs $a$ or $c$ with the day or night thermostat. As shown in Fig. 1, for example, the spring $b$ engages that part of the field B that constitutes an inward extension of the outermost field A and hence the spring $a$ is now functional to connect the source of electricity through the feed wire 10 to the thermostat blade 41. The inner commutator plate $32^a$ is provided at its periphery with a circumferential tongue $31^c$ projecting forwardly beneath the inward extension just referred to. The point 44 from which the spring $b$ will snap down upon the tongue $31^c$, is shown in the illustration as being adjusted opposite the hour of nine o'clock p. m., and thereafter said constant spring $b$ coöperates with the spring $c$ over the inner plate to connect the source of electricity with the night thermostat blade 42. This condition obtains until the commutator disk is rotated with the hands of the clock, until the constant spring $b$ snaps over the point 45, back upon the outer plate $31^a$. As above stated, these plates $31^a$ and $32^a$ are independently rotatable for adjustment around the axis of the shaft 33, and the illustration given shows that this return of the constant spring $b$ to change to the day thermostat will take place at 6 a. m. It will be understood also that when the change of this connection from one thermostat to the other takes place, the thermostat that is thus cut out remains idle until the clock mechanism operates far enough to reëstablish such connection according to the adjustment of the commutator 29.

The general structure of the thermostats illustrated is more or less conventional in so far as the free end of each blade is adapted to make contact on one side or the other with a pair of spaced contact points 46 and 47, (see Fig. 5) and the effect of the action of the blade is variable by a finger piece 48 adjustable independently of all other adjustment of the system along a graduated arc 49, showing the range of temperatures for which the thermostats are adaptable. By way of illustration, we indicate the finger piece 48 of the day thermostat set to maintain a uniform temperature of 70, while the night thermostat is set to maintain a standard temperature of about 50. Each of these thermostats, however, is adapted to be variously adjustable in an obvious manner.

Completing the description of the connection between the thermostats and the motor mechanism, and which description will be applicable to both thermostats, we may suggest that if the variation of temperature in the room causes the thermostat blade to make contact with the contact point 46 of the day thermostat, as shown in Fig. 1, the immediate effect is that the electricity is conducted along the following course: from the feed wire $10^b$ through the constant contact spring $b$, plate $31^a$, spring $a$, wire 39, blade 41, contact point 46, wire 50 to contact spring 24 of the cylindrical commutator, and thence through the shell beneath the spring 24 and contact spring 25 and wire $10^a$ to the motor. The motor will now start and continue in operation until the shaft 15 and the two cylindrical parts clamped thereto make a half rotation, as described earlier. It will be remembered, however, that as soon as the gap 27 passes beneath and beyond the contact spring 25, the circuit will be cut out through the thermostat, but will be continued through the motor along the following course: direct feed wire 10, spring 21, circuit breaker 19, spring 22, and wire $10^a$, the motor stopping at the end of the half rotation by virtue of the dead point 20 separating the spring 22 from the cylindrical surface of the circuit breaker 19. Therefore all connection between the feed wires and the motor will remain broken until the change of temperature causes the thermostat blade to shift to the opposite contact point 47, when the feed of the electricity will be delivered to the motor through the commutator 23 in substantially the same manner as above described, but including the wire 51 and contact spring 26, instead of the wire 50 and spring 24.

Since the contact between the blade 41 or 42, and the contact point 46 or 47, due to the ordinary thermostatic action of the blade, is inclined to be very feeble and deleterious arcing is apt to result, we provide a means to immediately transform the contact point mechanism into an electromagnet, the screw carrying the point becoming the core of the magnet, with the result that the contact is made strong and positive as a direct result of any contact of the blade therewith, no matter how feeble such contact. As shown in Fig. 5, we provide a small winding 52 between the screw and the circuit 50 or 51 leading to the motor controlling devices. The contact points 46 and 47 also are preferably of non-magnetic contact material, which prevents the freezing of the blade thereto due to residual magnetism, after the circuit is broken, due to the gap 27. Any suitable pawl and ratchet mechanism indicated at 53 may be employed to connect the disk commutator to the main shaft providing for the positive driving of the disk along with the action of the clock hands, but permitting independent adjustment of the disk parts in one direction around the axis of said shaft. By virtue of this pawl and ratchet connection between the main clock shaft 33ᵃ and the disk commutator, the commutator is always adapted to be driven positively and uniformly from the power shaft while the gear connections between the commutator and the minute hand provide for constant relation between the indicator of the commutator and the position of the hands. Also the setting or the adjustment of the clock hands will provide a corresponding rotation of the commutator indicator without disturbing the changeable time adjustment of the two contact plates of the commutator.

We claim:

1. In a heat regulator, the combination of a motor, regulating connections controlled by the operation of the motor, a source of energy for the motor, a pair of independently adjustable thermostats between the source of energy and the same motor, and means to bring the thermostats into operation in alternation automatically and each to the exclusion of the other.

2. In a heat regulator, the combination of an electric motor adapted for use with either direct or alternating current, mechanical connections between the motor and the parts to be controlled, a pair of independently adjustable thermostats connected to the motor, and time controlled devices for automatically bringing the thermostats into operative relation with the motor in alternation according to any desired temperatures and at any desired predetermined hours of the day or night.

3. In a heat controller, the combination of an electric motor adapted for use with either direct or alternating current, mechanical connections between the motor and the parts to be controlled, means to supply energy to the motor, the last mentioned means including a pair of thermostats variably adjustable to different standard temperatures, time controlled means to automatically bring the thermostats into operation successively and repeatedly one after the other according to predetermined hours of the day or night and each to the exclusion of the other, and automatic means to stop the motor after a predetermined extent of movement.

4. In a heat controller, the combination of an electric motor adapted for use with either direct or alternating current, means to supply energy to the motor, the course of the supply being through main and auxiliary lines, a pair of thermostats independently adjustable to provide for the control of the motor at different predetermined standard temperatures arranged in the auxiliary line, time controlled means to bring the thermostats into operative relation with the line in repeated succession one after the other according to any desired hours of the day or night and each to the exclusion of the other, either thermostat being in operative connection serving to start the motor, means to cut out the auxiliary line and connect the main line with the motor immediately after the starting of the motor, and means to automatically stop the motor at a predetermined time after it has been started.

5. In an automatic heat regulator, the combination of power means to move the parts to be regulated, a pair of thermostats connected to the power means, said thermostats being independently adjustable at the will of the operator to an indefinite number of adjustments, and automatic means to bring the thermostats into operation in continual succession each to the exclusion of the other.

6. In an automatic heat controller, the combination of power means to actuate the parts to be regulated, standard high and low temperature devices, and automatic time controlled means to bring said temperature devices into controlling relation with the power devices in continual succession each to the exclusion of the other at any predetermined hours of the day or night.

7. In an adjustable heat controller, the combination of an electric rotary motor adapted for use in either direct or alternating current, mechanical connections therewith to actuate the parts to be controlled, a controller shaft driven at low speed from the motor shaft, a commutator and a circuit breaker connected to the controller shaft, a pair of independently adjustable thermostats, one for higher and the other for lower temperature, means to selectively connect the thermostats with said commutator, connections between the commutator and the motor whereby the operation of the selected thermostat will start the motor, connections to cause the continuation of the motor after it has been started and the starting thermostat has been cut out by the commutator, the aforesaid circuit breaker serving to stop the motor after a predetermined number of rotations of the motor shaft, and automatic time controlled means to bring the thermostats into operative relation with the motor in succession one after the other according to any desired predetermined hours of the day or night.

8. In a device of the character set forth, the combination of a pair of independently adjustable thermostats, clock mechanism, a commutator connected to the clock mechanism for direct operation therefrom, said commutator including an indicator showing all hours of the day or night and also including a pair of concentric relatively and circumferentially adjustable contact plates, said contact plates providing independent innermost and outermost contact fields and an intermediate field, a part of one contact plate constituting a tongue movable beneath an extension of the other plate during said circumferential adjustment, and connections between the commutator and the several thermostats including a contact member coöperating in succession with the parts of the contact plates constituting the intermediate field, the change from one plate to the other being determined by the adjustment of the contact plates and whereby the selective timing of the thermostats is effected in accordance with the operation of the clock mechanism.

9. In an automatic heat controller, the combination of a pair of independently adjustable thermostats, clock mechanism including a power shaft and a minute hand shaft, means carried by the clock mechanism to cause the thermostats to become functional in alternation and in succession, the last mentioned means including an indicator disk and two independent contact plate disks relatively adjustable with respect to each other and said indicator disk, but normally movable with the disk, and means to drive said disk positively and directly from the power shaft, said disk being connected with the minute hand shaft so as to always bear a definite relation thereto.

HOWELL W. SOUDER.
ROBERT H. SOUDER.

Witnesses:
HENRY GEISSINGER,
WILLIAM SHUGG.